J. M. WINNINGHAM.
PIPE COUPLING MACHINE.
APPLICATION FILED JAN. 25, 1916.

1,242,627.

Patented Oct. 9, 1917.
3 SHEETS—SHEET 1.

Witnesses
N. Abramson

Inventor
James M. Winningham

By Wa Edmund
Attorney

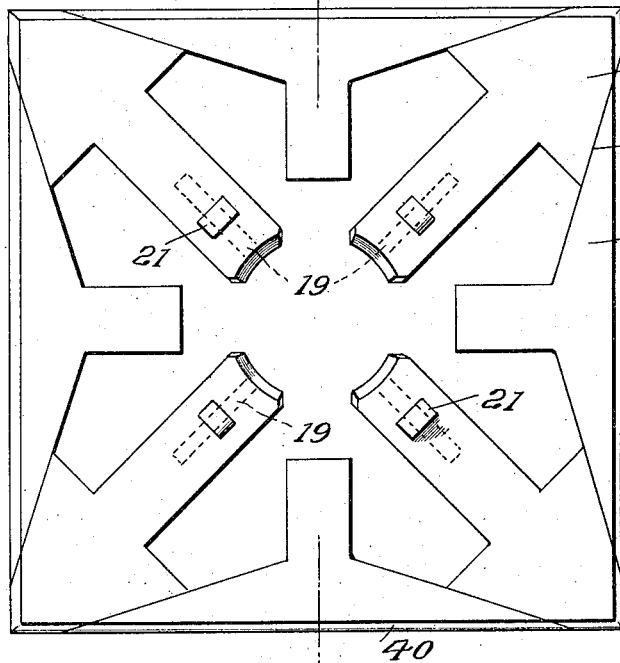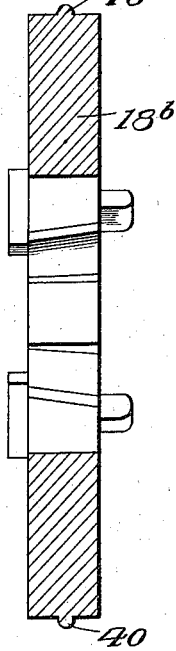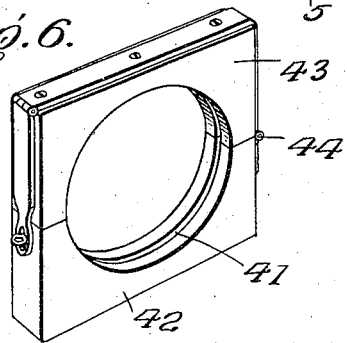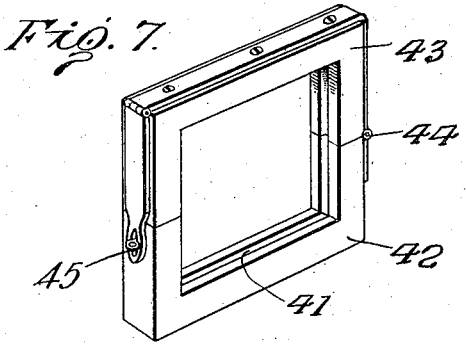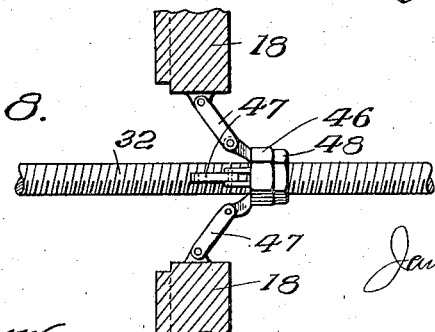

J. M. WINNINGHAM.
PIPE COUPLING MACHINE.
APPLICATION FILED JAN. 25, 1916.
1,242,627.
Patented Oct. 9, 1917.
3 SHEETS—SHEET 3.
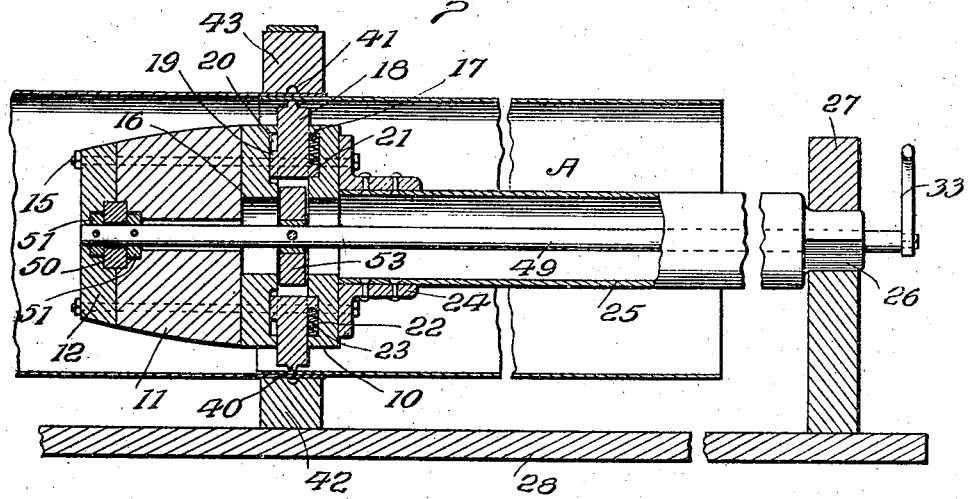
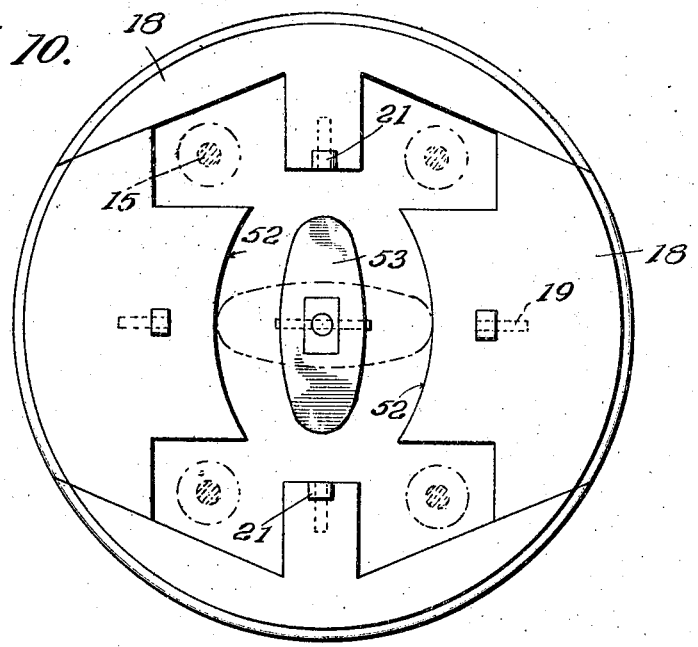
Witnesses
N. Abramson
Inventor
James M. Winningham
By W. A. Redmond
Attorney

UNITED STATES PATENT OFFICE.

JAMES M. WINNINGHAM, OF HENDERSON, TENNESSEE.

PIPE-COUPLING MACHINE.

1,242,627.  Specification of Letters Patent.  Patented Oct. 9, 1917.

Application filed January 25, 1916. Serial No. 74,115.

*To all whom it may concern:*

Be it known that I, JAMES M. WINNINGHAM, citizen of the United States, residing at Henderson, in the county of Chester and State of Tennessee, have invented a certain new and useful Pipe-Coupling Machine, of which the following is a specification.

This invention relates to pipe connecting and has special reference to a machine for connecting sheet metal pipes by forming a pair of coacting beads in the overlapped portions of such pipes as down-spouts, stove pipes and the like.

One object of the invention is to provide an improved and simplified general construction for machines of this character.

A second object of the invention is to provide an improved machine wherein the entire periphery of the beads will be formed at the same time.

With the above and other objects in view, as will be hereinafter apparent, the invention consists in general of certain novel features of construction and combinations of parts hereinafter fully described, illustrated in the accompanying drawings and set forth in the claims.

In the accompanying drawings like characters of reference indicate like parts in the several views, and:

Fig. 4 is a face view of a second form of a set of expanding blocks in their fully expanded position.

Fig. 5 is a section on the line 5—5 of Fig. 4.

Fig. 6 is a perspective view of a female die suitable for use with the first set of blocks.

Fig. 7 is a perspective view of a female die suitable for use with the second set of blocks.

Fig. 8 is a detail showing a modified form of expansion means.

Fig. 9 is a view similar to Fig. 1 but of a modified form.

Fig. 10 is a face view, on a larger scale, of the expanding blocks of Fig. 9 showing the parts in their fully expanded position.

Figure 1:
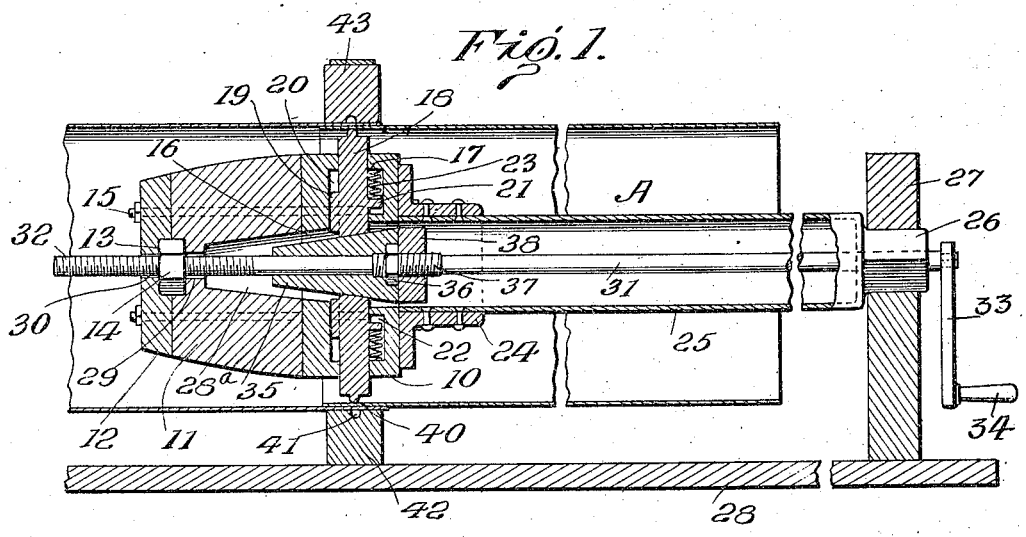
Figure 1 is a longitudinal sectional view of the device as applied to a pipe joint in readiness to bead the same.

In the embodiment of the invention herein illustrated in Figs. 1 to 8, there is provided an expansion mandrel indicated in general at A and this mandrel is provided with a die block 10 resting against a body 11 provided with a cover plate 12. The body 11 and cover plate 12 are provided with opposed polygonal recesses 13 wherein fits a nut 14 so that the nut is prevented from turning with respect to body 11 and plate 12.

This body 11, plate 12 and die block or head 10 are secured together by bolts 15. The die block 10 is provided with a centrally disposed frusto-conical opening 16 and extending from this opening is a radial opening 17 for the reception of die members 18 which are provided with guide portions 19 fitting in slots 20 and with lugs 21 moving in slots 22. Between the outer ends of the slots 22 and the lugs 21 are interposed springs 23 which constantly urge the dies 18 inward. The die block 10 is preferably made in two parts to permit assembling and secured to the block is a flange member 24 to which is fixed a tubular handle 25 carrying at its end a bearing 26 preferably polygonal in contour so that it can be mounted immovably in a standard 27 fixed to a base 28. However, this standard and base may be dispensed with if desired, the handle being simply manually supported.

The body 11 is provided with a frusto-conical recess 28ª terminating in an opening 29 communicating with the nut recess 13 and from this nut recess, in the cover plate, extends an opening 30.

Through the bearing 26 and nut 14 extends a shaft 31, the shaft being provided with a threaded portion 32 where it passes through the nut 14 so that, as the shaft is rotated, it will move longitudinally of the head. This shaft is provided on its end with a crank arm 33 having a handle 34 by means of which the shaft may be rotated.

Mounted on this shaft 31 is the expanding member which consists of a cone 35 carrying a nut 36 mounted on an enlarged and threaded portion 37 of the shaft 31. This cone 35 is locked in position by a jam nut 38 and bears against the inner ends of the die members 18.

Figure 2:
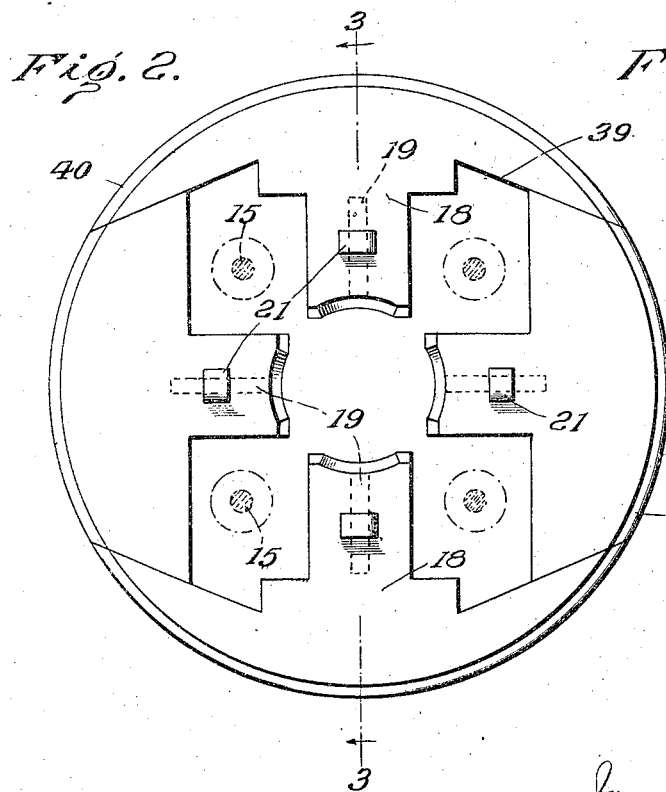
Fig. 2 is a face view of one form of a set of expanding blocks in their fully expanded position.
Figure 3:
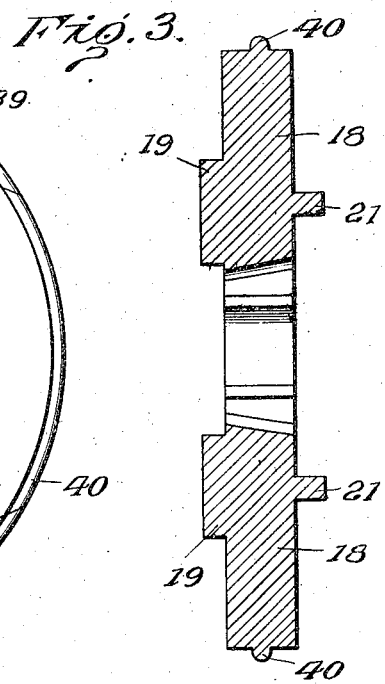
Fig. 3 is a section on the line 3—3 of Fig. 2.

In the form shown in Figs. 2 and 3 these die members are arcuate in contour and their contacting surfaces are beveled as at 39 so that, as the lateral members expand, the upper and lower members will also move outward.

In the form shown in Figs. 4 and 5 only the corner members 18ª contact with the cone, the lateral members 18ᵇ being forced outward by the angular disposition of the beveled contacting surfaces 39ª.

Each of these forms has the different members of the respective set of dies provided with a peripheral bead 40 arranged to coact with a groove 41 formed within a two part matrix or female die, the lower part of which is indicated at 42 and is preferably fixed on the base 28 while the upper part 43 is hinged to the lower at one side by a hinge 44 and can be locked to the lower part at the opposite side by a catch 45.

The form shown in Fig. 8 varies somewhat from the cone expander since a fixed collar 46 is employed which is connected by diagonal links 47 to the dies 18, the collar being locked to the shaft 31 by a nut 48 or any other suitable means.

In the form shown in Figs. 9 and 10 the shaft 31 is replaced by a plain shaft 49 which passes through a bearing 50 replacing the nut 14. On each side of this bearing is a collar 51 secured to the shaft. Between the inner arcuate ends 52 of opposite members 18 there is fixed to the shaft 49 an elliptical cam 53 so proportioned that, when the shaft 49 is given one-quarter of a revolution the members 18 will be forced out to their farthest extent. This last form is especially adapted for light work where no great expansive force is required.

In operation two sections of pipe are assembled as shown in Fig. 1 on the mandrel, the dies being collapsed and the outer or female die member open. The outer member is then closed and the crank turned until the dies are forced out and the sections of pipe crimped into the groove of the female die or outer member. The handle is next turned to permit collapse of the dies and the outer female die member opened. The pipe may then be withdrawn from the mandrel.

There has been provided a simple and efficient device of the kind described and for the purpose specified.

Having thus described the invention, what is claimed as new, is:

In a pipe coupling machine, a base, a two-part female die member having its lower part fixed to said base and the upper part removable from the lower part, means for locking the parts together, a standard fixed to said base and spaced from said female die member, an elongated tubular member fixed in said standard and projecting toward the female die member, an expansion mandrel fixed to the end of said tubular member and comprising a body having a longitudinal recess opening into said tubular member, a radial opening in said body extending from said recess to the periphery of the body, a series of male die members arranged in said radial opening in line with said female die member and having coacting inclined edges, means for normally projecting the inner ends of said male die members into said recess, a shaft mounted in said standard and extending through the tubular member and into the recess in the body of said mandrel and rotatably supported in the outer end of said mandrel, means on said shaft for engaging the projecting ends of the male die members upon the rotation of the shaft to cause them to move outwardly toward the female die member, whereby two sections of pipe may be placed in the machine and their ends overlapped between the male and female die members and a continuous bead formed therein to connect said pipe sections.

In testimony whereof, I affix my signature, in the presence of two witnesses.

JAMES M. WINNINGHAM.

Witnesses:
W. E. GIBSON,
R. C. DAVIDSON.

Copies of this patent may be obtained for five cents each, by addressing the "Commissioner of Patents, Washington, D. C."